US008241787B2

United States Patent
Fujinami et al.

(10) Patent No.: US 8,241,787 B2
(45) Date of Patent: Aug. 14, 2012

(54) LIQUID ELECTROLYTE FOR ELECTROCHEMICAL DEVICE

(75) Inventors: Tatsuo Fujinami, Hamamatsu (JP); Takahiro Aoki, Hamamatsu (JP); Masaki Matsui, Susono (JP)

(73) Assignees: National University Corporation Shizuoka University, Shizuoka-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/377,737

(22) PCT Filed: Sep. 13, 2007

(86) PCT No.: PCT/JP2007/067864
§ 371 (c)(1),
(2), (4) Date: Sep. 24, 2010

(87) PCT Pub. No.: WO2008/032795
PCT Pub. Date: Mar. 20, 2008

(65) Prior Publication Data
US 2011/0008685 A1    Jan. 13, 2011

(30) Foreign Application Priority Data

Sep. 14, 2006    (JP) .................................. 2006-249238

(51) Int. Cl.
*H01M 6/14*    (2006.01)
*H01M 6/16*    (2006.01)
(52) U.S. Cl. .................. 429/188; 429/324; 429/340
(58) Field of Classification Search .................. None
See application file for complete search history.

(56) References Cited

U.S. PATENT DOCUMENTS

| | | | | |
|---|---|---|---|---|
| 3,915,743 | A | * | 10/1975 | Lauck ........................... 429/326 |
| 6,045,948 | A | * | 4/2000 | Wang et al. .............. 429/231.95 |
| 6,350,946 | B1 | | 2/2002 | Miyake et al. |
| 2002/0022182 | A1 | | 2/2002 | Heider et al. |
| 2004/0091772 | A1 | * | 5/2004 | Ravdel et al. ................. 429/188 |

FOREIGN PATENT DOCUMENTS

| | | |
|---|---|---|
| EP | 2 202 826 | 6/2010 |
| GB | 1211773 | 11/1970 |
| GB | 1 423 978 | 2/1976 |
| JP | 59-154767 | 9/1984 |
| JP | 2-262269 | 10/1990 |
| JP | 2-262270 | 10/1990 |
| JP | 2-262271 | 10/1990 |
| JP | 4-229560 | 8/1992 |
| JP | 11-149943 | 6/1999 |
| JP | 2000-138072 | 5/2000 |
| JP | 2005-510017 | 4/2005 |
| WO | WO 03/043109 A1 | 5/2003 |

OTHER PUBLICATIONS

Extended European Search Report for EP Appl. No. 07807271.7, dated Jan. 12, 2011.

* cited by examiner

*Primary Examiner* — Barbara Gilliam
*Assistant Examiner* — Stephan Essex
(74) *Attorney, Agent, or Firm* — Finnegan, Henderson, Farabow, Garrett & Dunner, LLP

(57) ABSTRACT

The principal object of the present invention is to provide a liquid electrolyte for electrochemical device having a wide potential window. The invention solves the problem by providing a liquid electrolyte for electrochemical device, which comprises an electrolyte dissolved in an $MF_x$ complex being liquid at ordinary temperatures wherein "M" represents B, Si, P, As or Sb and "X" represents the valence of "M".

7 Claims, 2 Drawing Sheets

LIQUID ELECTROLYTE FOR ELECTROCHEMICAL DEVICE

CROSS-REFERENCE TO RELATED APPLICATIONS

This application is a national phase application of International Application No. PCT/JP2007/067864, filed Sep. 13, 2007, and claims the priority of Japanese Application No. 2006-249238, filed Sep. 14, 2006, the contents of both of which are incorporated herein by reference.

TECHNICAL FIELD

The present invention relates to a liquid electrolyte for electrochemical device, which has a wide potential window and is particularly excellent in oxidation resistance.

BACKGROUND ART

Conventionally, solutions having a lithium salt dissolved in a non-aqueous solvent have been used as liquid electrolytes used in lithium secondary batteries. Furthermore, mixed solvents of ethylene carbonate, propylene carbonate, diethyl carbonates etc. are generally used as the non-aqueous solvent.

These carbonate-based solvents are generally used as the non-aqueous solvent, but suffer from a problem of poor oxidation resistance. Accordingly, there is demand for hardly oxidized liquid electrolytes, from the viewpoint of improvement in the performance of lithium secondary batteries. Generally, liquid electrolytes are preferably those hardly undergoing oxidation and reduction; in order words, liquid electrolytes with a wide potential window are desired.

On the other hand, lithium secondary batteries having a $BF_3$ complex added to a liquid electrolyte are known. For example, Patent Document 1 discloses a non-aqueous lithium battery using a $BF_3$ complex as a capacity reduction rate-suppressing additive. Patent Document 1 addresses prevention of a lithium secondary battery from reducing in capacity during long-term use by using a $BF_3$ complex as an additive. Patent Document 2 discloses a non-aqueous electrolyte secondary battery comprising a Werner-type complex of boron trifluoride. Patent Document 2 aims at preventing a film of lithium halide such as LiF from occurring on the surface of an anode by using a $BF_3$ complex as an additive, thereby suppressing an increase in battery impedance.

In both of Patent Documents 1 and 2, however, the $BF_3$ complex is used absolutely as an additive, and the amount of the complex used is very small. Specifically, the amount of the $BF_3$ complex is about 1 to 5% by weight based on the electrolyte in Patent Document 1, and the amount of the $BF_3$ complex is about 0.5 to 5% by weight based on the whole of the liquid electrolyte in Patent Document 2. Furthermore, in Patent Documents 1 and 2, there is no description to the effect that the performance of the lithium secondary battery is improved by widening the potential window of the liquid electrolyte.

Patent Document 3 discloses an electrode active material for lithium secondary battery, which further comprises an amphoteric compound such as a $BF_3$ complex in an electrode active material.

Patent Document 1: Japanese Patent Application Laid-Open (JP-A) No. 11-149943
Patent Document 2: JP-A No. 2000-138072
Patent Document 3: Japanese Patent Application National Publication (Laid-Open) No. 2005-510017

DISCLOSURE OF INVENTION

Problem to be Solved by the Invention

The present invention has been completed in view of the present circumstances described above, and the principal object of the present invention is to provide a liquid electrolyte for electrochemical device having a wide potential window.

Means for Solving Problem

To solve the problem described above, the present invention provides a liquid electrolyte for electrochemical device, which comprises an electrolyte dissolved in an $MF_x$ complex being liquid at ordinary temperatures wherein "M" represents B, Si, P, As or Sb and "X" represents the valence of "M".

According to the present invention, a liquid electrolyte for electrochemical device having a wide potential window can be obtained by using the $MF_x$ complex as solvent.

In the present invention, the $MF_3$ complex is preferably a $BF_3$ complex. This is because the $BF_3$ moiety of the $BF_3$ complex is highly acidic, and thus a liquid electrolyte for electrochemical device, which is excellent in oxidation resistance etc., can be obtained.

In the present invention, the $BF_3$ complex is preferably a $BF_3$-diethylether complex. This is because a liquid electrolyte for electrochemical device, which is excellent in oxidation resistance etc., can be obtained.

In the present invention, the electrolyte is preferably $LiN(SO_2CF_3)_2$, $LiN(SO_2C_2F_5)_2$ or $LiPF_6$. This is because such electrolyte is soluble in the $BF_3$ complex.

In the present invention, it is preferable that the liquid electrolyte for electrochemical device further comprises a solubilizer. This is because the solubility of the electrolyte can be further improved by adding the solubilizer.

The present invention provides a lithium secondary battery comprising the liquid electrolyte for electrochemical device described above.

According to the present invention, the liquid electrolyte for electrochemical device described above can be used to provide an electrochemically stable lithium secondary battery.

Effect of the Invention

In the present invention, there is brought about an effect of obtaining a liquid electrolyte for electrochemical device, which has a wide potential window and is particularly excellent in oxidation resistance.

BEST MODE FOR CARRYING OUT THE INVENTION

Figure 1:
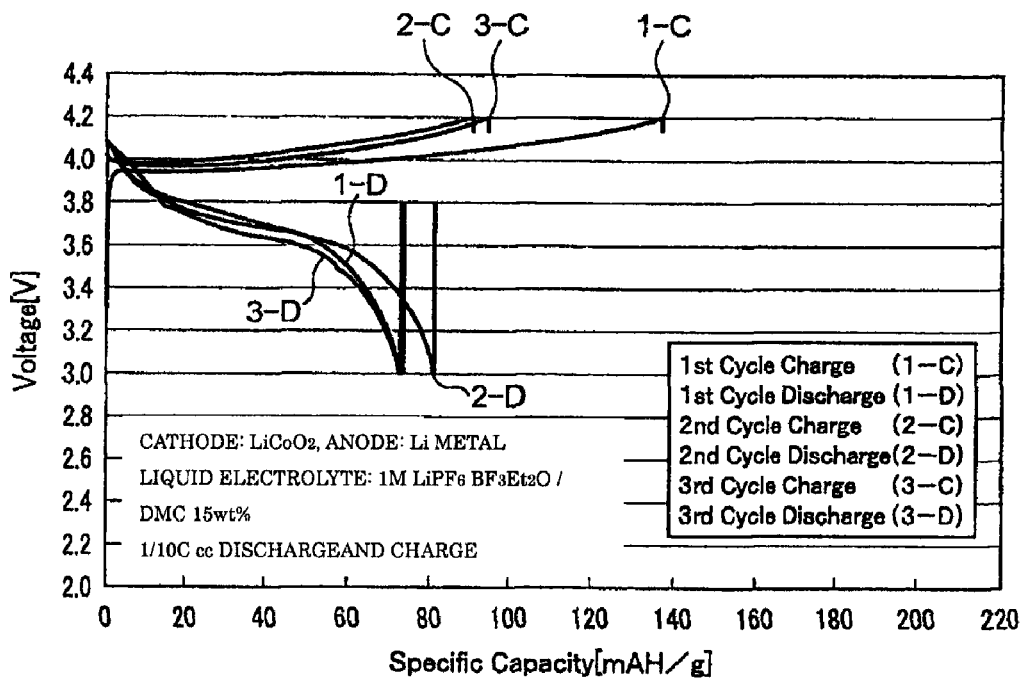
FIG. 1 is a graph showing the charge-discharge properties of a lithium secondary battery obtained in Example 1.

Hereinafter, the liquid electrolyte for electrochemical device and the lithium secondary battery according to the present invention are described in detail.

A. Liquid Electrolyte for Electrochemical Device

First, the liquid electrolyte for electrochemical device of the present invention (in some cases also referred to simply as liquid electrolyte) is described. The liquid electrolyte for electrochemical device of the present invention comprises an electrolyte dissolved in an $MF_x$ complex being liquid at ordinary temperatures wherein "M" represents B, Si, P, As or Sb and "X" represents the valence of "M".

According to the present invention, the $MF_x$ complex can be used as solvent to produce a liquid electrolyte for electrochemical device having a wide potential window. Generally, the breadth of the potential window of an organic solvent is closely related to the acidity-basicity of the organic solvent. A strong acidity of an organic solvent means that an electron is hardly withdrawn from, and an electron is easily accepted by, the organic solvent; and a strong basicity of an organic solvent means that an electron is easily withdrawn from, and an electron is hardly accepted by, the organic solvent. The $MF_x$ complex used in the present invention includes, for example, a $BF_3$ complex having an organic molecule coordinated in an unoccupied orbital of boron in $BF_3$, and the $BF_3$ moiety of this $BF_3$ complex is so acidic that electrons of the coordinated organic molecule are attracted to the $BF_3$ moiety. Accordingly, the oxidation resistance of the organic molecule moiety of the $BF_3$ complex can be improved to provide a liquid electrolyte having a wide potential window.

Next, the liquid electrolyte for electrochemical device of the present invention is described by reference to each constitution.

1. $MF_x$ Complex

First, the $MF_x$ complex of the present invention is described. In the present invention, the $MF_x$ complex being liquid at ordinary temperatures is used as the solvent for the liquid electrolyte for electrochemical device. The term "being liquid at ordinary temperatures" refers to a state of being fluid at 25° C.

In the $MF_x$ complex, "M" represents B (boron), Si (silicon), P (phosphorus), As (arsenic) or Sb (antimony). In the present invention, among which "M" is preferably B, Si or P, and particularly preferably B. In the $MF_x$ complex, "X" represents the valence of "M" and indicates the number of F (fluorine) which depending on the type of "M", are bound to "M".

Specifically, the $MF_x$ complex represents a $BF_3$ complex, a $SiF_4$ complex, a $PF_5$ complex, an $AsF_5$ complex or an $SbF_5$ complex. In the present invention, the $MF_x$ complex is particularly preferably a $BF_3$ complex.

The $BF_3$ complex is usually a complex having $BF_3$ and an organic molecule. The $BF_3$ complex comprises an organic molecule coordinated in an unoccupied orbital of boron in $BF_3$. In the present invention, it is necessary that the $BF_3$ complex be liquid at ordinary temperature. The general formula of the $BF_3$ complex is shown below.

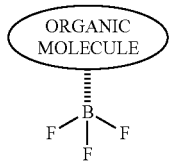

[Chemical Formula 1]

The organic molecule, although not particularly limited as long as it is coordinated in an unoccupied orbital of boron in $BF_3$, usually possesses a functional group having an unshared electron pair. The functional group having an unshared electron pair although not particularly limited includes, for example, a carbonate group, an ether group, an ester group, an amido group, an amino group, a sulfone group, a hydroxyl group and a cyano group etc., and among which, a carbonate group and an ether group are preferable.

The organic molecule is preferably one which is coordinated with $BF_3$ at a ratio of 1:1. A carbonate such as ethylene carbonate or propylene carbonate possesses an oxygen atom having an unshared electron pair in the vicinity of its carbonyl group, and when the carbonyl group is coordinated in an unoccupied of boron in $BF_3$, usually the organic molecule can be said to be coordinated with $BF_3$ at a ratio of 1:1 because $BF_3$ is not coordinated with the oxygen atom due to a reduction in electron density on the oxygen atom. As described above, even if the organic molecule possesses a plurality of unshaved electron pairs, the organic molecule is preferably one which can be coordinated with $BF_3$ substantially at a ratio of 1:1.

The molecular weight of the organic molecule, although not particularly limited as long as the $BF_3$ complex being liquid at ordinary temperature can be obtained, is usually in the range of 46 to 300. When the molecular weight is too high, the $BF_3$ complex may be solidified.

The organic molecule may be liquid or gaseous as long as it can give the $BF_3$ complex being liquid at ordinary temperatures.

Specific examples of such organic molecules include carbonates such as dimethyl carbonate, diethyl carbonate, ethylene carbonate, propylene carbonate, and methoxyethylmethyl carbonate; ethers such as dimethyl ether, diethyl ether, tetrahydrofuran (THF), and methyltetrahydrofuran; nitriles such as methoxypropionitrile and acetonitrile; esters such as methyl acetate; amines such as triethylamine; alcohols such as methanol; and ketones such as acetone.

In the present invention, the $BF_3$ complex is preferably a member selected from the group consisting of a $BF_3$-diethylether complex, a $BF_3$-diethylcarbonate complex, a $BF_3$-dimethylether complex, a $BF_3$-ethylenecarbonate complex, a $BF_3$-propylenecarbonate complex, a $BF_3$-methoxyethylmethylcarbonate complex, and a $BF_3$-methoxypropionitrile complex. Among them, the $BF_3$-diethylether complex is preferable.

The $BF_3$-diethylether complex and $BF_3$-dimethylether complex can be purchased as commercial reagents. On the other hand, the $BF_3$-diethylcarbonate complex, $BF_3$-ethylenecarbonate complex, $BF_3$-propylenecarbonate complex, $BF_3$-methoxyethylmethylcarbonate complex and $BF_3$-methoxypropionitrile complex are novel compounds and should thus be newly synthesized.

The method for synthesizing the novel compounds includes, for example, a method which involves preparing a commercial $BF_3$-ether complex as a raw material and mixing it with an organic molecule for substitution, followed by distillation under reduced pressure etc., thereby substituting the ether moiety of the $BF_3$-ether complex by the organic molecule for substitution. As a specific example, a method of synthesizing the $BF_3$-methoxypropionitrile complex is described. First, a commercial $BF_3$-diethyether complex is prepared as a raw material and then added with an equimolar amount of methoxypropionitrile as an organic molecule for substitution, and the mixture is stirred at room temperature for about 90 hours under passage of argon, followed by distillation under reduced pressure at about 2 mmHg under heating at about 40° C., thereby producing the $BF_3$-methoxypropionitrile complex. The $BF_3$-diethylcarbonate complex, the $BF_3$-ethylenecarbonate complex, the $BF_3$-propylenecarbonate complex, the $BF_3$-methoxyethylmethylcarbonate complex can also be synthesized by the same method.

In the liquid electrolyte for electrochemical device of the present invention, the $MF_x$ complex being liquid at ordinary temperature is used as solvent. As described later, a solubilizer such as ethylene carbonate may be contained in the solvent. The minimum amount of the $MF_x$ complex included in the liquid electrolyte for electrochemical device of the present invention, although not particularly limited as long as it can exhibit an effect of widening the potential window of the electrolyte, is usually 10% by weight or more, preferably 30% by weight or more, more preferably 50% by weight or more, and further more preferably 70% by weight or more. On the other hand, the maximum amount of the $MF_x$ complex varies depending on the amount of the electrolyte used, etc., but usually all the solvent used in the liquid electrolyte is preferably the $MF_x$ complex.

2. Electrolyte

Next, the electrolyte used in the present invention is described. The electrolyte used in the present invention is not particularly limited as long as it is dissolved in the $MF_x$ complex. The type of the electrolyte varies depending on the use of the liquid electrolyte and includes, for example, Li salts, Na salts and quaternary ammonia salts, among which Li salts are preferable. This is because they can be used in lithium secondary batteries useful as secondary batteries.

The Li salts that can be used may be general Li salts which include, but are not limited to, for example, $LiN(SO_2CF_3)_2$ (in some cases also referred to as LiTFSI), $LiN(SO_2C_2F_5)_2$ (in some cases also referred to as LiBETI), $LiClO_4$, $LiBF_4$, $LiPF_6$, $LiSO_3CF_3$, LiBOB, and $LiPF_3(C_2F_5)_3$, and among which, $LiN(SO_2CF_3)_2$, $LiN(SO_2C_2F_5)_2$ and $LiPF_6$ are preferable. This is because these salts are soluble in the $BF_3$ complex.

The proportion of the electrolyte included in the liquid electrolyte for electrochemical device of the present invention varies depending on the use of the liquid electrolyte for electrochemical device, and is usually about 0.1 to 3 M.

3. Solubilizer

The liquid electrolyte for electrochemical device of the present invention preferably further comprises a solubilizer. This is because the solubility of the electrolyte can further be improved by adding a solubilizer. For example, depending on the type of the electrolyte, the electrolyte may be hardly dissolved in the $MF_x$ complex as solvent. In such case, the liquid electrolyte can be one having a desired electrolyte concentration by adding a solubilizer.

The type of the solubilizer is not particularly limited as long as the solubility of the electrolyte can be improved, and general non-aqueous solvents can be used. Specific examples include ethylene carbonate, propylene carbonate, diethyl carbonate, dimethyl carbonate, γ-butyrolactone, diethylene glycol dimethyl ether, ethylene glycol dimethyl ether, and dimethyl ether. These solubilizers may be used singly or as a mixture of two or more thereof.

The amount of the solubilizer used is not particularly limited as long as the liquid electrolyte having a wide potential window can be obtained. Specifically, the solubilizer is used in such a ratio that the amount of the MFx complex included in the liquid electrolyte for electrochemical device reaches the amount described above in "1. $MF_x$ Complex".

5. Use of the Liquid Electrolyte for Electrochemical Device

Next, the use of the liquid electrolyte for electrochemical device of the present invention is described. The liquid electrolyte for electrochemical device of the present invention can be used for example in secondary batteries, capacitors or sensors, and among them, preferably in secondary batteries or capacitors, and further particularly preferably in secondary batteries. Furthermore, the liquid electrolyte for electrochemical device of the present invention is used preferably for lithium secondary batteries among the secondary batteries. In the present invention, there is provided a lithium secondary battery comprising the above-mentioned liquid electrolyte for electrochemical device. According to the present invention, an electrochemically stable lithium secondary battery can be obtained by comprising the liquid electrolyte for electrochemical device.

The present invention is not limited to the embodiments described above. The embodiments described above are mere illustrative, and those having substantially the same constitution and the same working effect as in the technical idea described in the claims of the present invention are included in the technical scope of the present invention.

EXAMPLES

Hereinafter, the present invention is described in more detail by reference to the Examples.

Example 1

Preparation of a Liquid Electrolyte

A $BF_3$-diethylether complex ($BF_3Et_2O$) as a $BF_3$ complex and dimethyl carbonate (DMC) as a solubilizer were prepared, and mixed at a weight ratio of 85:15, to produce a mixed solvent. An electrolyte $LiPF_6$ was dissolved to a concentration of 1 M in this mixed solvent to produce the liquid electrolyte of the present invention.

(Preparation of a Coin Cell-Type Secondary Battery)

First, a cathode of a coin cell-type secondary battery was prepared. As a binder, PVDF (poly(vinylidene fluoride)) was prepared and dissolved in 1-pyrrolidinone to yield a uniform PVDF solution. Then, $LiCoO_2$ was prepared as a cathode active material, and acetylene black (AB) was prepared as a conductive material, and these materials were ground and then added gradually to the above PVDF solution. Thereafter, this mixture was stirred vigorously for 24 hours to yield highly viscous slurry. Thereafter, this slurry was applied onto an aluminum substrate prepared as a collector and dried to produce a cathode. The raw materials were prepared such that $LiCoO_2$:PVDF:AB=80:10:10. Then, an Li metal foil was prepared as an anode of a coin cell-type secondary battery. Thereafter, a coin cell-type secondary battery having a constitution of the cathode/electrolyte-charged Celgard/the anode in a glove box filled with argon was prepared.

Example 2

A $BF_3$-diethylether complex ($BF_3Et_2O$) as a $BF_3$ complex and propylene carbonate (PC) as a solubilizer were prepared, and mixed at a weight ratio of 85:15, to produce a mixed solvent. An electrolyte $LiPF_6$ was dissolved to a concentration of 1 M in this mixed solvent to produce the liquid electrolyte of the present invention. Then, this liquid electrolyte was used to prepare a coin cell-type secondary battery in the same manner as in Example 1.

Example 3

A $BF_3$-diethylether complex ($BF_3Et_2O$) as a $BF_3$ complex and dimethyl ether (DME) as a solubilizer were prepared, and mixed at a weight ratio of 90:10, to produce a mixed solvent. An electrolyte $LiPF_6$ was dissolved to a concentration of 1 M in this mixed solvent to produce the liquid electrolyte of the present invention. Then, this liquid electrolyte was used to prepare a coin cell-type secondary battery in the same manner as in Example 1.

[Evaluation]

Figure 2:
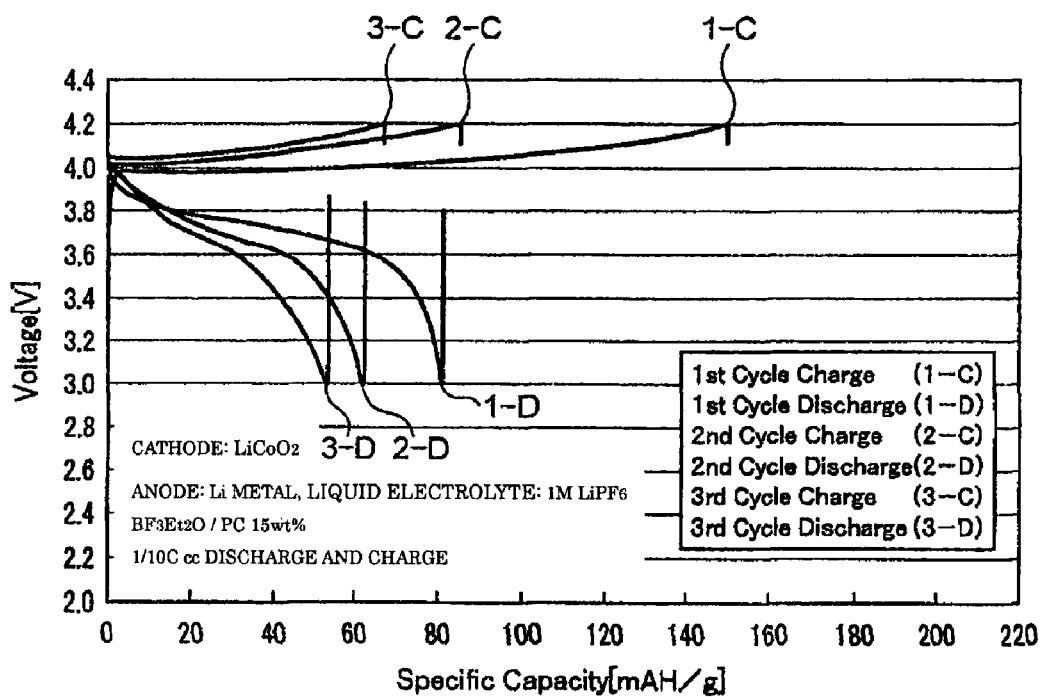
FIG. 2 is a graph showing the charge-discharge properties of a lithium secondary battery obtained in Example 2.
Figure 3:
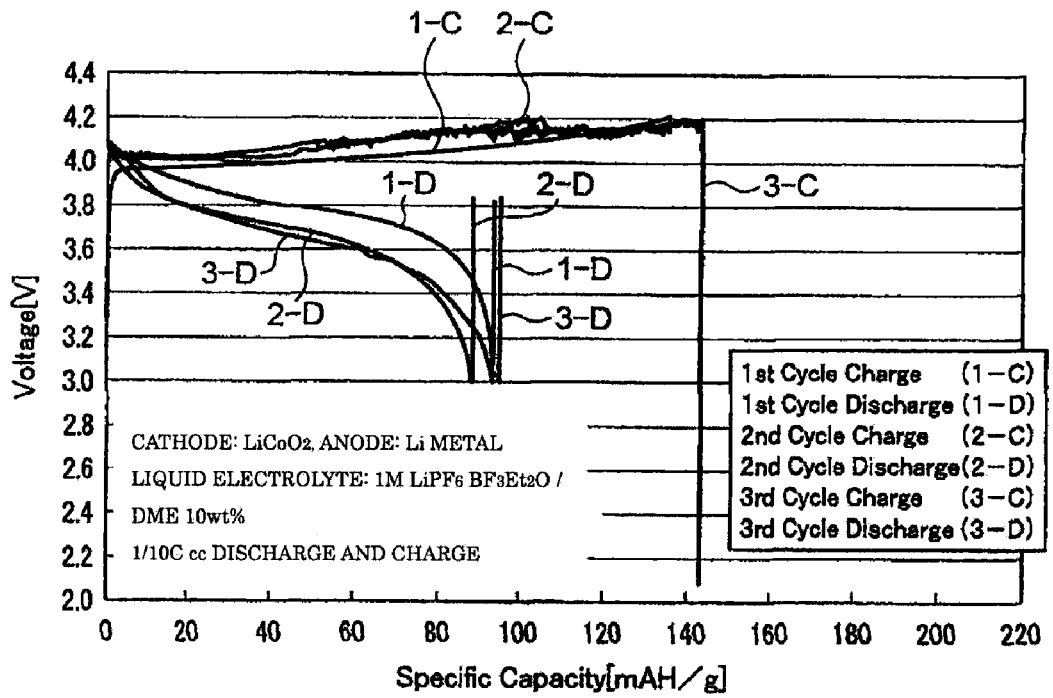
FIG. 3 is a graph showing the charge-discharge properties of a lithium secondary battery obtained in Example 3.
Figure 4:
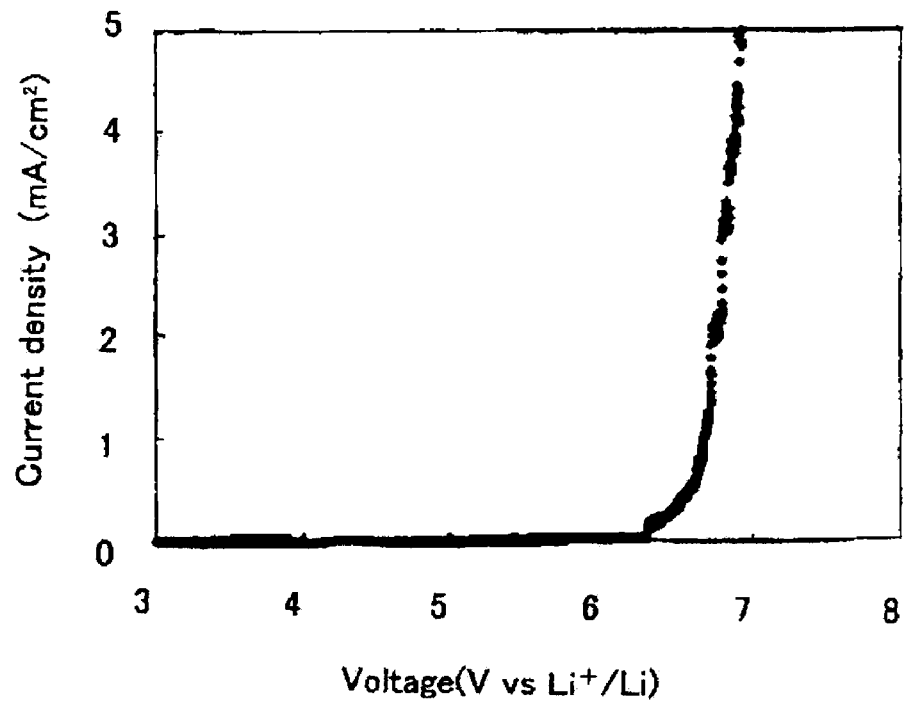
FIG. 4 is a graph showing the oxidation resistance of $BF_3Et_2O$ by linear sweep voltammetry.

The coin cell-type secondary batteries obtained in Examples 1 to 3 were evaluated for their charge-discharge properties by galvanostatic measurement at a current density of 0.1 mA/cm$^2$ with a battery charging and discharging device (HJ-SM8 system, manufactured by Hokuto Denko Corporation). FIGS. 1 to 3 are graphs showing the charge-discharge properties of the lithium secondary batteries obtained respectively in Examples 1 to 3. The oxidation potential of $BF_3Et_2O$ as determined by linear sweep voltammetry (FIG. 4) was as high as 6.2 V, thus indicating excellent oxidation resistance.

The invention claimed is:

1. A liquid electrolyte for electrochemical device, comprising:
    a $BF_3$ complex being liquid at ordinary temperature; and
    an electrolyte dissolved in the $BF_3$ complex,
    wherein the $BF_3$ complex is a complex having $BF_3$ and an organic molecule, and an amount of the $BF_3$ complex is at least 50% by weight or more of the liquid electrolyte.

2. The liquid electrolyte for electrochemical device according to claim 1, wherein the $BF_3$ complex is a $BF_3$-diethylether complex.

3. The liquid electrolyte for electrochemical device according to claim 1, wherein the electrolyte is $LiN(SO_2CF_3)_2$, $LiN(SO_2C_2F_5)_2$ or $LiPF_6$.

4. The liquid electrolyte for electrochemical device according to claim 1, further comprising a solubilizer.

5. A lithium secondary battery comprising the liquid electrolyte for electrochemical device according to claim 1.

6. The liquid electrolyte for electrochemical device according to claim 1, wherein an amount of the $BF_3$ complex is at least 70% by weight or more of the liquid electrolyte.

7. A liquid electrolyte for electrochemical device, comprising:
    an $MF_x$ complex being liquid at ordinary temperature, in which "M" represents Si, As or Sb and "X" represents a valence of "M"; and
    an electrolyte dissolved in the $MF_x$ complex.

* * * * *